(12) United States Patent
Takahashi et al.

(10) Patent No.: US 6,770,317 B2
(45) Date of Patent: Aug. 3, 2004

(54) WHIPPED CREAM

(75) Inventors: Emi Takahashi, Tokyo (JP); Kenji Ikeda, Tokyo (JP); Yasuo Okutomi, Tokyo (JP)

(73) Assignee: Asahi Denka Kogyo Kabushiki Kaisha, Tokyo (JP)

( * ) Notice: Subject to any disclaimer, the term of this patent is extended or adjusted under 35 U.S.C. 154(b) by 314 days.

(21) Appl. No.: 09/958,562

(22) PCT Filed: Feb. 7, 2001

(86) PCT No.: PCT/JP01/00856

§ 371 (c)(1),
(2), (4) Date: Oct. 10, 2001

(87) PCT Pub. No.: WO01/58279

PCT Pub. Date: Aug. 16, 2001

(65) Prior Publication Data

US 2003/0035859 A1 Feb. 20, 2003

(30) Foreign Application Priority Data

| Feb. 10, 2000 | (JP) | ........... | 2000-034067 |
| Mar. 22, 2000 | (JP) | ........... | 2000-080338 |
| Feb. 2, 2001 | (JP) | ........... | 2001-026678 |
| Feb. 2, 2001 | (JP) | ........... | 2001-026679 |

(51) Int. Cl.[7] .............................................. A23G 3/00
(52) U.S. Cl. ...................... 426/586; 426/602; 426/564
(58) Field of Search .................. 426/565, 519, 426/524, 586, 602, 564

(56) References Cited

U.S. PATENT DOCUMENTS

| 4,396,638 A | * | 8/1983 | Edo et al. ............... 426/564 |
| 4,434,186 A | * | 2/1984 | Desia et al. ............. 426/565 |
| 4,874,627 A | * | 10/1989 | Greig et al. ............. 426/565 |
| 5,084,295 A | * | 1/1992 | Whelan et al. .......... 426/565 |
| 6,010,734 A | * | 1/2000 | Whelan et al. .......... 426/565 |
| 6,635,300 B2 | * | 10/2003 | Adolphi et al. ......... 426/565 |

FOREIGN PATENT DOCUMENTS

| EP | 0 354 356 | * | 2/1990 |
| JP | A 60-87750 | | 5/1985 |
| JP | 62-118855 | | 5/1987 |
| JP | A 6-225720 | | 8/1994 |
| JP | 7-177857 | | 7/1995 |
| JP | 8-256716 | | 10/1996 |
| JP | A 8-256716 | | 10/1996 |
| JP | A 9-187242 | | 7/1997 |
| JP | 9-187242 | | 7/1997 |

* cited by examiner

Primary Examiner—N. Bhat
(74) Attorney, Agent, or Firm—Young & Thompson

(57) ABSTRACT

Whipped cream of the present invention contains substantially no spherical fat particles having a particle diameter of 1 μm or greater, or contains 10% or more of spherical fat particles having a particle diameter of 0.1 μm or smaller, or contains 20% by volume or more of spherical fat particles having a particle diameter of 0.4 μm or smaller.

10 Claims, 1 Drawing Sheet ated in an sonicator attached to the analyzer for 60 seconds to prepare a sample, on which measurement is made with the analyzer under a refractive index condition of 1.60–0.20 i to determine the particle diameter and the number of spherical fat particles.

WHIPPED CREAM

This application is a 371 of PCT/JP01/00856 filed Feb. 7, 2001.

TECHNICAL FIELD

The present invention relates to whipped cream that can be preserved refrigeration for a long time.

BACKGROUND ART

Needing no whipping, whipped cream is convenient to use unlike whipping cream which is supplied as liquid and whipped on use. However, whipped cream, being instable against time, is so liable to reduce the overrun and the machine resistance that it needs freezing for long-term preservation particularly when highly overrun as described in JP-A-60-87750.

JP-A-6-225720 discloses a frothing oil-in-water emulsion composition which can be preserved in a whipped state for a long time under refrigeration.

The whipped cream described in JP-A-60-87750 has a high overrun but should be frozen for preservation and requires thawing, which is inconvenient. The composition according to JP-A-6-225720 can be preserved for a long time by refrigeration but has a low overrun.

Accordingly, an object of the present invention is to provide whipped cream which has a high overrun and can be preserved for a long time under refrigeration.

DISCLOSURE OF THE INVENTION

The present invention accomplishes the above object by providing whipped cream characterized by containing substantially no spherical fat particles having a particle diameter of 1 $\mu$m or greater (hereinafter also referred to as first whipped cream).

The present invention also accomplishes the above object by providing whipped cream characterized by containing 10% or more of spherical fat particles having a particle diameter of 0.1 $\mu$m or smaller (hereinafter also referred to as second whipped cream).

The present invention also accomplishes the above object by providing whipped cream characterized by having such a spherical fat particle size distribution that 20% by volume or more of spherical fat particles have a particle diameter of 0.4 $\mu$m or smaller as measured with a Shimadzu laser diffraction particle size analyzer (SALD-1100, supplied by Shimadzu Corp.) on a sample prepared by dispersing whipped cream in ion-exchanged water and ultrasonicating the dispersion (hereinafter also referred to as third whipped cream).

BEST MODE FOR CARRYING OUT THE INVENTION

Figure 1:
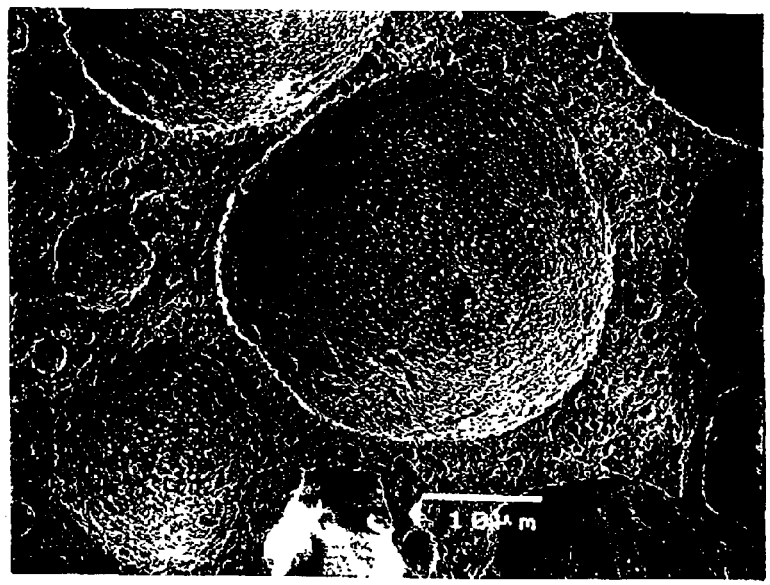
FIG. 1 is an electron micrograph showing the structure of spherical fat particles of the whipped oil-in-water cream prepared in Example 2.

The whipped cream of the present invention will be described in detail hereunder.

The first whipped cream will be described first. The language "containing substantially no spherical fat particles having a particle diameter of 1 $\mu$m or greater" as used with reference to the first whipped cream means that the content of the spherical fat particles having a particle diameter of 1 $\mu$m or greater is not more than 1%, preferably not more than 0.5%, still preferably not more than 0.2%. The percent used herein refers to the percentage of the number of spherical fat particles having a particle diameter of 1 $\mu$m or greater to the total number of spherical fat particles.

The particle diameter and the number of spherical fat particles are measured with an apparatus which can determine the particle size and the number of spherical fat particles, for example a Shimadzu laser diffraction particle size analyzer SALD-2100, manufactured by Shimadzu Corp.

Measurement with the Shimadzu laser diffraction particle size analyzer SALD-2100, manufactured by Shimadzu Corp., is carried out by, for example, as follows. Whipped cream is dispersed in ion-exchanged water and ultrasonicated in an sonicator attached to the analyzer for 60 seconds to prepare a sample, on which measurement is made with the analyzer under a refractive index condition of 1.60–0.20 i to determine the particle diameter and the number of spherical fat particles.

The second whipped cream will then be described. The second whipped cream contains spherical fat particles having a particle diameter of 0.1 $\mu$m or smaller in an amount of 10% or more, preferably 20% or more, still preferably 30% or more. The percent used herein refers to the percentage of the number of spherical fat particles having a particle diameter of 0.1 $\mu$m or smaller to the total number of spherical fat particles The particle diameter and the number of the spherical fat particles are measured in the same manner as for the first whipped cream.

It is preferred for the first and the second whipped cream to have substantially no spherical fat particles having a particle diameter of 1 $\mu$m or greater and to contain 10% or more of spherical fat particles having a particle diameter of 0.1 $\mu$m or smaller.

It is preferred for the first and the second whipped cream to have substantially no spherical fat particles whose particle diameter is 1 $\mu$m or greater on the interface of air bubbles. "To have substantially no spherical fat particles whose particle diameter is 1 $\mu$m or greater on the interface of air bubbles" means absence of spherical fat particles whose particle diameter is 1 $\mu$m or greater on the interface of air bubbles under observation through an electron microscope.

The third whipped cream is then described. The third whipped cream contains spherical fat particles having a particle diameter of 0.4 $\mu$m or smaller in an amount of 20% by volume or more, preferably 25% by volume or more, still preferably 30% by volume or more, based on the total spherical fat particles as measured by the above-described method of measuring particle size distribution.

It is preferred for the third whipped cream to contain spherical fat particles having a particle diameter of 0.3 $\mu$m or smaller in an amount of 10% by volume or more, particularly 15% by volume or more, especially 20% by volume or more, based on the total spherical fat particles and also to contain spherical fat particles having a particle diameter of 0.2 $\mu$m or smaller in an amount of 5% by volume or more, particularly 8% by volume or more, especially 12% by volume or more, based on the total spherical fat particles.

Measurement of the particle size distribution in the present invention is carried out as follows. A sample prepared by dispersing whipped cream in ion-exchanged water, followed by ultrasonication is analyzed with a Shimadzu laser diffraction particle size analyzer SALD-1100, manufactured by Shimadzu Corp. In this case, whipped cream dispersed in ion-exchanged water is ultrasonicated in an sonicator (frequency: 0.47 kHz; 35 W) attached to the Shimadzu laser diffraction particle size analyzer for 60 seconds to prepare a sample, which is analyzed with the above-described Shimadzu laser diffraction particle size analyzer under a refractive index condition of 1.60–0.20 i to determine the particle size.

The fats and oils which constitute the oily phase of the whipped cream of the present invention (including the first, second and third whipped cream, hereinafter the same) include, but are not limited to, various vegetable or animal fats and oils, such as palm oil, palm kernel oil, coconut oil, corn oil, cotton seed oil, soybean oil, rapeseed oil, rice oil, sunflower oil, safflower oil, beef tallow, milk fat, lard, cocoa butter, fish oil, and whale oil; and processed fats and oils obtained by subjecting these fats and oils to one or more treatments selected from hydrogenation, fractionation and ester exchange. Preferred of these fats and oils is palm kernel olein hardened oil. These fats and oils can be used either individually or as a combination of two or more thereof The content of the above-described fats and oils in the whipped cream of the present invention is preferably 10 to 50% by weight, still preferably 20 to 40% by weight, particularly preferably 25 to 35% by weight.

The aqueous phase of the whipped cream according to the present invention preferably comprises protein and sugar.

The protein includes, but is not limited to, whey proteins, such as α-lactalbumin, β-lactoglobulin, and serum albumin, casein and other milk proteins; low-density lipoprotein, high-density lipoprotein; egg proteins, such as phosvitin, livetin, phosphoglycoprotein, ovalbumin, conalbumin, and ovomucoid; wheat proteins, such as gliadin, glutenin, prolamin and glutelin; and other vegetable and animal proteins. According to the purpose, these proteins can be added individually or as a mixture of two or more thereof or in the form of a foodstuff containing one or more of these proteins.

The content of the protein in the whipped cream of the present invention is preferably 0.05 to 10% by weight, still preferably 0.1 to 6% by weight.

The sugar includes, but is not limited to, glucose, fructose, sucrose, maltose, enzyme-saccharified sugar (malt syrup), lactose, saccharified reduced starch, isomerized liquid sugar, sucrose-coupled malt syrup, oligosaccharides, reducing sugar polydextrose, sorbitol, reduced lactose, trehalose, xylose, xylitol, maltitol, erythritol, mannitol, fructo-oligosaccharides, soybean oligosaccharides, galacto-oligosaccharides, lactosucrose, raffinose, lactulose, palatinose-oligosaccharides, stevia, and Aspartame. Of these sugars, sugar alcohols, such as saccharified reduced starch, reduced lactose, sorbitol, xylitol, maltitol, erythritol, and mannitol, are preferred. These sugars can be used either individually or as a combination of two or more thereof The sugar content in the whipped cream of the present invention is preferably 10 to 70% by weight, still preferably 25 to 60% by weight.

Where a water-containing substance such as milk or liquid sugar is used as a protein or a sugar, there is no need to add water in an aqueous phase of the whipped cream of the present invention. The amount of water, if added, is preferably 0 to 50% by weight, still preferably 5 to 40% by weight, particularly preferably 10 to 40% by weight.

If necessary, the whipped cream of the present invention can contain an emulsifier and a stabilizer in the oily phase and/or the aqueous phase thereof.

The emulsifier includes, but is not limited to, lecithin, glycerol fatty acid esters, glycerol acetate fatty acid esters, glycerol lactate fatty acid esters, glycerol succinate fatty acid esters, glycerol diacetyltartrate fatty acid esters, sorbitan fatty acid esters, sucrose fatty acid esters, sucrose acetate isobutyrate, polyglycerol fatty acid esters, polyglycerol condensed ricinoleate, propylene glycol fatty acid esters, calcium stearoyl lactate, sodium stearoyl lactate, polyoxyethylene sorbitan monostearate, and polyoxyethylene sorbitan monoglyceride. These emulsifiers can be used either individually or as a combination of two or more thereof The content of the emulsifier in the whipped cream of the present invention is preferably 0 to 5% by weight, still preferably 0.15 to 3% by weight.

The stabilizer includes phosphoric acid salts (e.g., hexametaphosphorates, secondary phosphates and primary phosphates), alkali metal (e.g., potassium or sodium) salts of citric acid, guar gum, xanthan gum, tamarind gum, carrageenan, alginic acid salts, Farceran, locust bean gum, pectin, Cardran, starch, processed starch, crystalline cellulose, gelatin, dextrin, agar, dextran, and propylene glycol alginate. These stabilizers can be used either individually or as a combination of two or more thereof. A combination of xanthan gum and pectin out of the above-recited stabilizers is particularly preferred for the whipped cream of the present invention. A preferred ratio of xanthan gum to pectin is 2:8 to 8:2 by weight. In using pectin, it is preferable to use high-methoxy pectin (HM pectin). HM pectin preferably has a degree of esterification (DE; the ratio of galacturonic acid present in the form of a methyl ester in the total galacturonic acid constituting HM pectin) of 50% or more, particularly 60% or more, especially 70% or more.

The content of the stabilizer in the whipped cream of the present invention is preferably 0 to 5% by weight, still preferably 0.01 to 1% by weight.

The whipped cream of the present invention can further contain tasty components, such as fruit juice, jam, dairy products, egg products, cocoa and cocoa products, coffee and coffee products, chestnut paste, and processed nuts products, spices, flavors, colorants, preservatives, antioxidants, pH adjusters, and the like.

A preferred process for producing the whipped cream according to the present invention will be described below.

An aqueous phase comprising water and other substances and an oily phase comprising a fat or an oil and other substances are prepared separately. The aqueous phase and the oily phase are mixed and emulsified to obtain an oil-in-water emulsion composition.

If desired, the resulting oil-in-water emulsion composition can be homogenized in a homogenizer, such as a valve homogenizer, a homo-mixer or a colloid mill, under a pressure ranging from 0 to 1000 kg/cm$^2$. Further, if desired, the composition can be subjected to pasteurization or sterilization, such as ultra high temperature (UHT) processing in a direct heating system using an injection heater, an infusion heater, etc. or an indirect heating system using a plate heater, a tubular heater or a scrape surface heat exchanger, high temperature short time (HTST) processing, low temperature processing, batchwise heat sterilization, retorting, or microwave heating. The composition may be directly heated by cooking. After the heating, the composition may be re-homogenized if necessary. If desired, the heated composition may be cooled rapidly or slowly.

The oil-in-water emulsion composition is then whipped in a vertical mixer or a continuous whipping machine to produce whipped cream.

The overrun of the resulting whipped cream is preferably 150 or more, still preferably 180 to 350, particularly preferably 210 to 300. The overrun is a value obtained from the following formula:

$$[(A-B)/B] \times 100$$

wherein A is the weight of a unit volume of cream, and B is the weight of a unit volume of whipped cream.

The whipped cream of the invention thus obtained is put into containers and preserved under refrigeration (at 0 to 15° C.). It is possible to preserve the whipped cream of the invention in a frozen state (at −18° C. or lower).

The present invention will now be illustrated in greater detail with reference to Examples, but it should be understood that the invention is not construed as being limited thereto.

EXAMPLES 1 TO 4

Examples of First and Second Whipped Creams:

An oily phase and an aqueous phase having the respective formulations shown in Table 1 below were prepared separately, mixed together, and emulsified. The emulsion was homogenized in a homogenizer (1000 kg/cm²), sterilized in a scrape surface heat exchanger, and cooled to 10° C. to obtain an oil-in-water emulsion. The oil-in-water emulsion was whipped in a continuous whipper (2000 rpm) to obtain a whipped oil-in-water cream.

In Table 1 are shown the overrun and machine resistance of the resulting whipped cream, the particle size distribution of spherical fat particles, and the results of electron microscopic observation to see whether or not spherical fat particles of 1 μm or greater are present on the air bubble interface. In addition, the whipped oil-in-water creams of Examples 1 and 4 were inspected for water separation, and the results obtained are also shown in Table 1 (+: water separated; ±: water separated slightly; −: no water separated). The electron micrograph of the whipped oil-in-water cream of Example 2 is shown in FIG. 1, which presents the structure of the spherical fat particles.

The particle size distribution of the spherical fat particles was measured as follows. Whipped cream was dispersed in ion-exchanged water and ultrasonicated in an sonicator attached to a Shimadzu laser diffraction particle size analyzer (SALD-2100, manufactured by Shimadzu Corp.) for 60 seconds to prepare a sample. Particle size measurement was made on the sample with the Shimadzu laser diffraction particle size analyzer under a refractive index condition of 1.60–0.20 i.

The machine resistance was evaluated by use of a food depositor (Cream Presser K-3, manufactured by Koyo Kikai K.K.; nozzle diameter: 5 mm; 30 rpm). Whipped cream that was discharged from the depositor without stopping and showed a specific gravity change within 10% after passing through the depositor was judged good.

The whipped oil-in-water creams of Examples 2 and 3 were preserved under refrigeration (at 5° C.). The overrun and machine resistance after 10 days' and 60 days' refrigeration are shown in Table 1. The whipped oil-in-water creams of Examples 1 and 4 were preserved under refrigeration (at 5° C.), and the overrun, machine resistance, and water separation were evaluated after 10 days', 60 days' or 120 days' refrigeration. The results are shown in Table 1.

TABLE I

|  | Formulation (wt %) | | | |
|---|---|---|---|---|
|  | Ex. 1 | Ex. 2 | Ex. 3 | Ex. 4 |
| Oily Phase | | | | |
| Palm kernel olein hardened oil (35° C.) | 28.0 | 31.0 | 30.0 | 28.0 |
| Fatty acid monoglyceride | 0.5 | 0.7 | — | 0.5 |
| Organic acid monoglyceride | — | — | 0.5 | — |
| Lecithin | 0.2 | 0.1 | 0.2 | 0.2 |
| Sucrose fatty acid ester | 0.5 | 0.5 | 0.5 | 0.5 |
| Carotene | — | 0.01 | — | — |
| Aqueous Phase | | | | |
| Casein Na | 2.5 | 3.0 | 2.5 | 2.5 |
| Sorbitol | 43.0 | 41.0 | 43.0 | 43.0 |
| Malt syrup | 7.6 | 7.6 | 7.6 | 7.6 |
| Water | 17.7 | 15.99 | 14.7 | 17.6 |
| Milk | — | — | 1.0 | — |
| Xanthan gum | — | — | — | 0.05 |
| HM pectin (DE: 72%) | — | — | — | 0.05 |
| Flavor | — | 0.1 | — | — |
| After Whipping Spherical fat particle size distribution (number %) | | | | |
| 1 μm ≦ | 0 | 0.1 | 0.1 | 0.1 |
| 0.1 μm ≧ | 30 | 25 | 28 | 29 |
| Overrun | 230 | 230 | 240 | 240 |
| Machine resistance | good | good | good | good |
| Water separation | — | | | — |
| After 10 days | | | | |
| Overrun | 230 | 230 | 235 | 235 |
| Machine resistance | good | good | good | good |
| Water separation | — | | | — |
| After 60 days | | | | |
| Overrun | 225 | 225 | 235 | 235 |
| Machine resistance | good | good | good | good |
| Water separation | — | | | — |
| After 120 days | | | | |
| Overrun | 225 | | | 230 |
| Machine resistance | good | | | good |
| Water separation | + | | | ± |
| Spherical fat particles (1 μm ≦) on air bubble interface under electron microscopic observation | none | none | none | none |

As is apparent from Table 1, the first and second whipped creams according to the present invention undergo little reduction in overrun and keep satisfactory machine resistance even when refrigerated for 60 days.

EXAMPLE 5

Example of Third Whipped Cream:

An oily phase and an aqueous phase having the respective formulations shown in Table 2 below were prepared separately, mixed together, and emulsified. The emulsion was homogenized in a homogenizer (1000 kg/cm²), sterilized in a scrape surface heat exchanger, and cooled to 10° C. to obtain an oil-in-water emulsion. The oil-in-water emulsion was whipped in a continuous whipper to obtain whipped oil-in-water cream.

The overrun, machine resistance, and spherical fat particle size distribution of the resulting whipped cream are shown in Table 2.

The particle size distribution of the spherical fat particles was measured as is follows. Whipped cream was dispersed in ion-exchanged water and ultrasonicated in an sonicator (frequency: 47 kHz; 35 W) attached to a Shimadzu laser diffraction particle size analyzer (SALD-1100, manufactured by Shimadzu Corp.) for 60 seconds to prepare a sample. Particle size measurement was made on the sample with the Shimadzu laser diffraction particle size analyzer under a refractive index condition of 1.60–0.20 i.

The machine resistance was evaluated in the same manner as in Example 1.

The whipped oil-in-water cream was refrigerated (at 5° C.). The overrun and machine resistance after 10 days' and 60 days' refrigeration are shown in Table 2.

TABLE 2

|  | Formulation (wt %) Example 5 |
|---|---|
| Oily Phase | |
| Palm kernel olein hardened oil (35° C.) | 30 |
| Fatty acid monoglyceride | 0.5 |
| Lecithin | 0.1 |
| Sucrose fatty acid ester | 0.5 |
| Aqueous Phase | |
| Casein Na | 2.5 |
| Sorbitol | 42 |
| Malt syrup | 7.6 |
| Water | 16.8 |
| After Whipping Spherical fat particle size distribution (vol %) | |
| $0.2\ \mu m \geq$ | 16 |
| $0.3\ \mu m \geq$ | 28 |
| $0.4\ \mu m \geq$ | 40 |
| Overrun | 230 |
| Machine resistance | good |
| After 10 Days | |
| Overrun | 230 |
| Machine resistance | good |
| After 60 Days | |
| Overrun | 225 |
| Machine resistance | good |

As is apparent from Table 2, the third whipped cream of the present invention undergoes little reduction in overrun and keeps satisfactory machine resistance even when refrigerated for 60 days.

EXAMPLES 6 TO 9

Examples of Third Whipped Cream:

An oily phase and an aqueous phase having the respective formulations shown in Tables 3 and 4 below were prepared separately, and whipped cream was obtained in the same manner as in Example 5.

The overrun, machine resistance, and spherical fat particle size distribution of the resulting whipped creams are shown in Tables 3 and 4. In addition, the whipped oil-in-water creams of Examples 8 and 9 were inspected for water separation, and the results obtained are also shown in Table 4 (+: water separated; ±: water separated slightly; −: no water separated).

The spherical fat particle size distribution and machine resistance were evaluated in the same manner as in Example 5.

Further, the whipped oil-in-water creams of Examples 6 and 7 was preserved under refrigeration (at 5° C.). The overrun and machine resistance after 10 days', 60 days' and 120 days' refrigeration are shown in Table 3. The whipped oil-in-water creams of Examples 8 and 9 were preserved under refrigeration (at 5° C.). The overrun, machine resistance, and water separation after 10 days', 60 days' or 120 days' refrigeration are shown in Table 4.

TABLE 3

|  | Formulation (wt %) | |
|---|---|---|
|  | Example 6 | Example 7 |
| Oily Phase | | |
| Palm kernel olein hardened oil (35° C.) | 31.0 | 29.0 |
| Fatty acid monoglyceride | 0.7 | — |
| Organic acid monoglyceride | — | 0.7 |
| Lecithin | 0.1 | 0.1 |
| Sucrose fatty acid ester | 0.5 | 0.6 |
| Aqueous Phase | | |
| Casein Na | 2.5 | 3.0 |
| Sorbitol | 42.0 | 35.0 |
| Malt syrup | 7.6 | 14.5 |
| Water | 15.0 | 16.4 |
| Concentrated strawberry juice | 0.5 | — |
| Powdered coffee | — | 0.5 |
| Flavor | 0.1 | 0.2 |
| After Whipping Spherical fat particle size distribution (vol %) | | |
| $0.2\ \mu m \geq$ | 15 | 15 |
| $0.3\ \mu m \geq$ | 29 | 27 |
| $0.4\ \mu m \geq$ | 41 | 38 |
| Overrun | 245 | 240 |
| Machine resistance | good | good |
| After 10 Days | | |
| Overrun | 240 | 235 |
| Machine resistance | good | good |
| After 60 Days | | |
| Overrun | 235 | 230 |
| Machine resistance | good | good |
| After 120 Days | | |
| Overrun | 235 | 230 |
| Machine resistance | good | good |

TABLE 4

|  | Formulation (wt %) | |
|---|---|---|
|  | Example 8 | Example 9 |
| Oily Phase | | |
| Palm kernel olein hardened oil (35° C.) | 30.0 | 30.0 |
| Fatty acid monoglyceride | 0.5 | 0.5 |
| Lecithin | 0.2 | 0.2 |
| Sucrose fatty acid ester | 0.3 | 0.5 |
| Aqueous Phase | | |
| Casein Na | 2.5 | 2.5 |
| Sorbitol | 43.0 | 43.0 |
| Malt syrup | 7.6 | 7.6 |
| Water | 14.6 | 14.5 |
| Milk | 1.0 | 1.0 |
| Xanthan gum | — | 0.05 |
| HM pectin (DE: 72%) | — | 0.05 |
| Flavor | 0.1 | 0.1 |
| After Whipping Spherical fat particle size distribution (vol %) | | |
| $0.2\ \mu m \geq$ | 17 | 17 |
| $0.3\ \mu m \geq$ | 30 | 30 |
| $0.4\ \mu m \geq$ | 42 | 42 |
| Overrun | 230 | 230 |

TABLE 4-continued

| | Formulation (wt %) | |
|---|---|---|
| | Example 8 | Example 9 |
| Machine resistance | good | good |
| Water separation | — | — |
| After 10 days | | |
| Overrun | 230 | 230 |
| Machine resistance | good | good |
| Water separation | — | — |
| After 60 days | | |
| Overrun | 225 | 225 |
| Machine resistance | good | good |
| Water separation | ± | — |
| After 120 days | | |
| Overrun | 225 | 225 |
| Machine resistance | good | good |
| Water separation | + | ± |

INDUSTRIAL APPLICABILITY

The whipped cream according to the present invention has a high overrun and can be preserved under refrigeration for an extended period of time.

What is claimed is:

1. A whipped cream comprising spherical fat particles wherein there are substantially no spherical fat particles having a particle diameter of 1 μm or greater.

2. A whipped cream comprising 10% or more of spherical fat particles having a particle diameter of 0.1 μm or smaller.

3. A whipped cream comprising spherical fat particles wherein there are substantially no spherical fat particles having a particle diameter of 1 μm or greater and containing 10% or more of spherical fat particles having a particle diameter of 0.1 μm or smaller.

4. The whipped cream according to claim 1, wherein said whipped cream has substantially no spherical fat particles whose particle diameter is 1 μm or greater on the interface of air bubbles.

5. A whipped cream comprising a spherical fat particle size distribution so that 20% by volume or more of spherical fat particles have a particle diameter of 0.4 μm or smaller.

6. The whipped cream according to claim 1, wherein said whipped cream has an overrun of 150 or more.

7. The whipped cream according to claim 1, further comprising palm kernel olein hardened oil.

8. The whipped cream according to claim 1, wherein said whipped cream is preserved under refrigeration.

9. The whipped cream according to claim 2, wherein said whipped cream has substantially no spherical fat particles whose particle diameter is 1 μm or greater on the interface of air bubbles.

10. The whipped cream according to claim 3, wherein said whipped cream has substantially no spherical fat particles whose particle diameter is 1 μm or greater on the interface of air bubbles.

* * * * *